June 20, 1972 — L. OKNER — 3,671,111
BIASED HINGE FOR SPECTACLE FRAMES
Filed Oct. 12, 1970
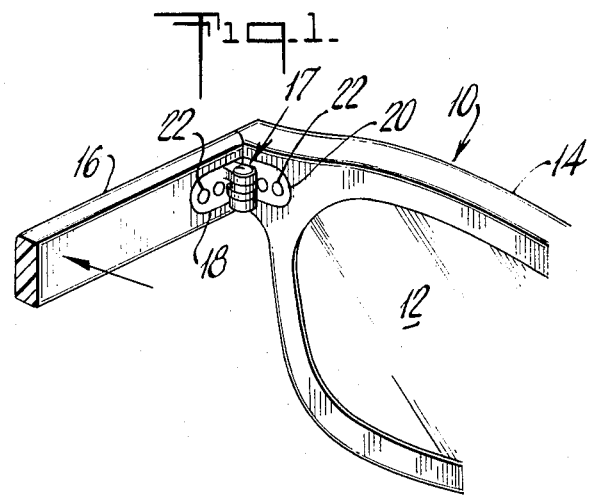
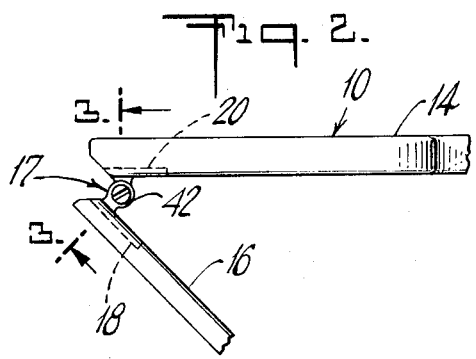
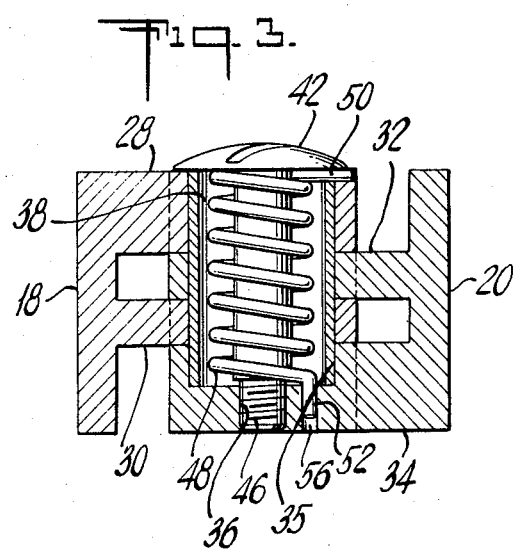
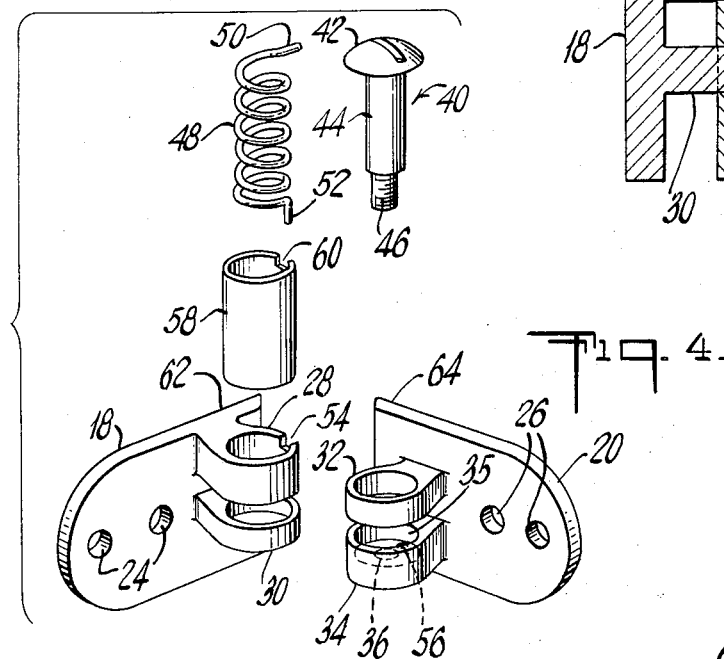
INVENTOR
LUKE OKNER
ATTORNEYS

United States Patent Office 3,671,111
Patented June 20, 1972

3,671,111
BIASED HINGE FOR SPECTACLE FRAMES
Luke Okner, Short Hills, N.J., assignor to Standard Optical Mfg. Company, Livingston, N.J.
Filed Oct. 12, 1970, Ser. No. 79,843
Int. Cl. G02c 5/16
U.S. Cl. 351—113
10 Claims

ABSTRACT OF THE DISCLOSURE

A biased hinge, particularly suited for joining the temple arms of spectacle frames to the lens-engaging means of spectacle frames. Two hinge plates are fastened to the members to be joined and have knuckle ears which extend from each of the hinge plates to coact and form a hinge barrel. A hinge tube is disposed within a hinge barrel and a resilient means is positioned within the hinge tube and connected to each of the hinge plates to bias the hinge in the desired position. A hinge pin extends through the hinge tube to hold the hinge assembly in operative position.

BACKGROUND OF THE INVENTION

Field of the invention

This invention relates to hinges in general, and to hinges particularly adapted for use in spectacles in particular.

Description of the prior art

Persons who wear spectacles have long been discomforted by spectacles which do not remain properly positioned on the face but, instead, tend to slide down the bridge of the nose. The tendency of the spectacles to slide is usually due to the looseness of the temple arms against the side of the head of the spectacle wearer.

Many attempts have been made to prevent the sliding of the spectacles by improving the grip of the temple arms. One approach has been to bias the temple arms of the spectacles by using a biased hinge to connect to temple arms to the lens-engaging means of the spectacle frame so that the arms would constantly be pressed against the side of the wearer's head. However, many devices to accomplish this purpose have not been completely successful. One of the problems is visual aesthetics. Very often the biased hinge is so large or must be positioned on the spectacle frame in such a manner that it is aesthetically obtrusive. For example, U.S. Pat. No. 2,967,325, issued to Herzfeld shows a spring loaded hinge for spectacles, but the spring device is clearly visible.

Another problem in providing a proper hinge is the safety hazard associated with the possibility of failure of a spring loaded hinge located near the human eye. Upon the failure of the spring, fragments of the hinge assembly may be sent flying and enter the eye, causing injury to the wearer of the spectacles. It is, therefore, extremely important when providing any sort of a biased hinge to insure that there is no possibility for fragments of the spring or other parts of the hinge to be projected into the eye when the spring fails. An example of a spectacle hinge having an exposed spring is U.S. Pat. No. 3,385,646, issued to Johnson.

Another problem involved in providing a biased hinge for spectacles is simplicity of construction. Since the hinge must be very small to unobtrusively fit on the spectacles, any machining operation which must be done on the small elements of the hinge will, of necessity, be relatively expensive and delicate. Therefore, all complex machining steps in producing the device should be minimized. An example of the type of machining operations to be avoided are shown in French Pat. No. 1,128,762, which has several parts requiring compound machining operations, such as forming countersinks with additional grooves in the hinge plates, or grooving shafts of screws.

Another problem which must be overcome in providing a biased hinge for spectacles is reliability. Since spectacles are taken off and put back on frequently during the day, the hinge is constantly in use. Accordingly, it is of prime importance that the design of the hinge provide for as little contact as possible between the delicate moving parts of the biased hinge.

SUMMARY OF THE INVENTION

To overcome the above-mentioned problems in the prior art, the applicant has provided a biased hinge particularly adapted for joining temple arms to lens-engaging means of spectacle frames. Two hinge plates attached to the members to be joined include knuckle ears which coact to form a hinge barrel. A hinge pin is inserted through the hinge barrel to hold the assembly together. A hinge tube disposed within the hinge barrel concentrically about the hinge pin contains a biasing means which is connected to each hinge plate to bias the hinge in the desired position.

Accordingly, it is an object of the present invention to provide a biased hinge adapted for use in spectacle frames which is small enough to be virtually indistinguishable from the standard hinges used in spectacle frames.

Another object of the present invention is to provide a biased hinge adapted for use in spectacle frames which is designed to insure maximum safety to the wearer of the spectacles against any failure of elements of the hinge.

Yet another object of the present invention is to provide a biased hinge adapted for use in spectacles in which all the portions of the hinge subject to a biasing stress are fully enclosed to prevent any possible projection of fragments of these members, should the member fail.

A further object of the present invention is to provide a biased hinge adapted for use in spectacle frames which is of simplified construction and easy to manufacture.

Yet another object of the present invention is to provide a biased hinge adapted for use in spectacle frames which is relatively economical to manufacture.

Still another object of the present invention is to provide a biased hinge for spectacles having great reliability and extended service life.

Various other objects and advantages of the invention will be apparent from the following description of an embodiment of the invention and the novel features will be particularly pointed out hereinafter in connection with the appended claims.

BRIEF DESCRIPTION OF THE DRAWINGS

FIG. 1 is a perspective view of a portion of a pair of spectacles having a temple arm hinge built in accordance with the teachings of the invention, with the temple arm in the full open position.

FIG. 2 is a top view of the pair of spectacles shown in FIG. 1 with the temple arm in the biased position.

FIG. 3 is a side view, in section, taken along lines 3—3 of FIG. 2.

FIG. 4 is an exploded view of FIG. 3.

DESCRIPTION OF THE PREFERRED EMBODIMENT

FIG. 1 shows a pair of spectacles generally indicated at 10 having lenses 12 held in lens-engaging means 14, and temple arms 16. The temple arms are pivotally connected to the lens-engaging means by means of a hinge assembly generally indicated at 17.

The hinge assembly consists of first and second hinge plates 18 and 20 connected respectively to the temple arm and the lens-engaging means by rivets 22 which pass through rivet holes 24 and 26 on the first and second hinge plates respectively. Each hinge plate has a plurality of knuckle ears extending from the hinge plate which are adapted to coact to form a hinge barrel. Hinge plate 18 has an upper knuckle ear 28 and a lower knuckle ear 30, while hinge plate 20 has an upper knuckle ear 32 and a lower knuckle ear 34.

As can be seen from FIG. 3, with the exception of knuckle ear 34, all of the knuckle ears have a uniform diameter passage throughout their length. Knuckle ear 34 has a large passage 35 similar to the passages in the other knuckle ears, which ends approximately halfway through the knuckle ear and connects to a small threaded passage 36 machined in the bottom of the knuckle ear at approximately the center of the hinge barrel. The knuckle ears 28, 30, 32 and 34 coact to form a hinge barrel 38 through which a hinge pin or a hinge screw 40 extends. The hinge pin has an enlarged head portion 42, a shank portion 44 and a threaded portion 46 at the bottom of the pin which engages the threaded portion 36 of knuckle ear 34.

Concentrically disposed about pin 40 within hinge barrel 38 is a helical spring 48 having an upper end 50 bent perpendicular to the longitudinal axis of the spring and a lower end 52 bent parallel to the longitudinal axis of the spring. A passage 56 parallel to threaded passage 36 in the bottom of knuckle ear 34 is positioned to accommodate the parallel end 52 of helical spring 48 and thereby secure the helical spring to knuckle ear 34, and therefore to hinge plate 20. A perpendicular passage 54 is formed in the upper end of knuckle ear 28 and is adapted to accommodate the perpendicular end 50 of spring 48 thereby fixing the other end of the spring to knuckle ear 28, and therefore to hinge plate 18.

A hinge tube generally indicated at 58 is disposed within hinge barrel 38 and encloses helical spring 48. A small passage 60 in the top of hinge tube 58 allows perpendicular end 50 of the spring to pass through the hinge tube and into passage 54 of upper knuckle ear 28. Hinge tube 58 eliminates any possibility of portions of spring 48 being projected from the hinge assembly should the spring break. Additionally, hinge tube 58 reduces stress on spring 48 by preventing the spring from coming into rubbing contact with the knuckle ears. If spring 48 were to rub against the knuckle ears, frictional forces in opposite directions would be produced because adjacent knuckle ears in the hinge barrel move in opposite relative directions when the hinge is opened or closed. These opposing frictional forces would be exerted on the spring, causing either tensile or compressive stresses on the spring which would tend to cause the spring to fail. Therefore, the presence of hinge tube 58 prevents these undesirable forces from being exerted on the spring.

It should be noted that the enlarged head 42 of the hinge pin 40 coacts with the passages 54 and 60 in the knuckle ear and hinge tube respectively to form a closed passage to securely hold perpendicular end 50 of helical spring 48. Additionally, the curvature of the helical spring 48 just prior to parallel end 52 would prevent any portion of the spring from passing through passage 56 and the lower knuckle ear 34.

Hinge plates 18 and 20 have interfering edges 62 and 64 respectively which extend beyond the location of the knuckle ears so that the hinge will be prevented from opening beyond an angle of ninety degrees or whatever predetermined angle is desired when the knuckle ears are in proper coacting position and secured by hinge pin 40.

The hinge assembly can be biased in the normally open or closed position simply by pre-stressing the helical spring in the opposite direction of the desired bias during assembly of the hinge. In the normally closed position, it will force the temple arms of the spectacles against the temples of the wearer to assist in keeping the spectacles in proper wearing position. In the normally opened position, the hinge will tend to open the temple arms of the spectacles as soon as they are removed from a spectacle case. This would be of assistance to people who require more than one pair of spectacles and must constantly change from one pair to the other.

It should be noted that although the invention is discussed with reference to use on spectacle frames, there are many other applications where the biased hinge described herein can be effectively used. Accordingly, the invention should in no way be construed as being restricted solely to applications for spectacles.

It will be understood that various changes in the details, materials and arrangement of parts which have been herein described and illustrated in order to explain the nature of the invention may be made by those skilled in the art within the present scope of the invention as expressed in the appended claims.

What is claimed is:

1. A biased hinge comprising:
a first hinge plate;
a second hinge plate;
at least one knuckle ear on said first hinge plate;
at least one knuckle ear on said second hinge plate;
said knuckle ear on said first hinge plate coacting with said knuckle ear on said second hinge plate to form a hinge barrel;
retaining means extending in said hinge barrel to operatively position said knuckle ear on said first hinge plate with respect to said knuckle ear on said second hinge plate;
a hinge tube in said hinge barrel spaced about said retaining means; and
resilient means disposed between said retaining means and said hinge tube associated with said first and second hinge plates to urge said hinge plates toward a predetermined position.

2. The biased hinge claimed in claim 1 wherein:
said resilient means includes a helical spring;
one of said knuckle ears includes
a threaded passage; and
a spring retaining passage substantially parallel to the axis of said helical spring;
another of said knuckle ears includes a spring retaining passage at one end thereof substantially perpendicular to the axis of said helical spring;
said hinge tube includes a passage at one end thereof aligned with said spring retaining passage substantially perpendicular to the axis of said helical spring;
one end of said helical spring extending into the spring retaining passage substantially parallel to the axis of the helical spring to fix said spring with relation to said knuckle ear, the other end of said helical spring extending into said passages in said hinge tube and said other knuckle ear perpendicular to the axis of said helical spring; and
said retaining means includes a hinge pin comprising
a threaded section engaging said threaded passage of said knuckle ear; and
a widened head section coacting with said passages in said ends of said hinge tube and said knuckle ear perpendicular to the axis of said helical spring to retain said end of said helical spring in said passages in said hinge tube and said knuckle ear.

3. The biased hinge claimed in claim 1 wherein:
said resilient means includes helical spring means; and
said retaining means includes a hinge pin disposed at least partially in said hinge tube.

4. The biased hinge claimed in claim 3 further comprising means connecting said helical spring means to at least one of said knuckle ears on at least one of said first and second hinge plates.

5. The biased hinge claimed in claim 4 wherein said means connecting said helical spring means to at least one of said knuckle ears on at least one of said first and second hinge plates comprise:
- a spring retaining passage in one of said knuckle ears disposed substantially parallel to the axis of said helical spring means; and
- an end portion of said helical spring means extending into said parallel passage to fix said helical spring means with relation to said knuckle ear.

6. The biased hinge claimed in claim 4 wherein said means connecting said helical spring means to at least one of said knuckle ears on at least one of said first and second hinge plates comprise:
- a spring retaining passage in one of said knuckle ears disposed substantially perpendicular to the axis of said helical spring means; and
- an end portion of said spring means extending into said perpendicular passage to fix said spring with relation to said knuckle ear.

7. The biased hinge claimed in claim 6 further comprising a passage in said hinge tube aligned with said substantially perpendicular passage in said knuckle ear to allow said end portion of said spring means to pass through said hinge tube and fix said spring means with relation to said hinge tube.

8. The biased hinge claimed in claim 3 wherein:
one of said knuckle ears includes a threaded passage; and
said hinge pin includes:
- a threaded section adapted to engage said threaded passage of said knuckle ear; and
- a widened head section adapted to engage another of said knuckle ears to thereby secure said first and second hinge plates with respect to each other.

9. The biased hinge claimed in claim 7 wherein:

said substantially perpendicular passage mean in said knuckle ear and said passage means in said hinge tube are disposed at the extreme end of said knuckle ear and hinge tube respectively; and said hinge pin includes a widened head section which coacts with the end of said hinge tube and said knuckle ear to retain said end of said spring in said hinge tube and knuckle ear passages.

10. The biased hinge claimed in claim 9 wherein said means connecting said helical spring means to at least one of said knuckle ears of at least one of said first and second hinge plates further comprise:
- a spring retaining passage in one of said knuckle ears connected to the other of said first and second hinge plates, said passage disposed substantially paralllel to the axis of said helical spring means; and
- an end portion of said spring extending into said parallel passage to fix said spring with relation to said knuckle ear.

References Cited

UNITED STATES PATENTS

| 2,939,168 | 7/1960 | Ferron | 16—128 A |
|---|---|---|---|
| 3,385,646 | 5/1968 | Johnson | 351—153 |
| 2,967,325 | 1/1961 | Herzfeld | 351—113 |

FOREIGN PATENTS

| 855,976 | 12/1960 | Great Britain | 351—113 |

DAVID SCHONBERG, Primary Examiner

R. L. SHERMAN, Assistant Examiner

U.S. Cl. X.R.

16—128 A